(No Model.) 5 Sheets—Sheet 1.

G., J. G. & M. O. REHFUSS.
BARREL MAKING MACHINE.

No. 380,931. Patented Apr. 10, 1888.

Witnesses.
David L. Williams
John E. Parker.

Inventors:
George Rehfuss, John G. Rehfuss,
& Martin O. Rehfuss
by their Attorneys,
Howson & Sons (No Model.) 5 Sheets—Sheet 2.

G., J. G. & M. O. REHFUSS.
BARREL MAKING MACHINE.

No. 380,931. Patented Apr. 10, 1888.

Witnesses:
David S. Williams
John E. Parker

Inventors:
George Rehfuss,
John G. Rehfuss &
Martin O. Rehfuss
by their Attorneys
Howson & Son

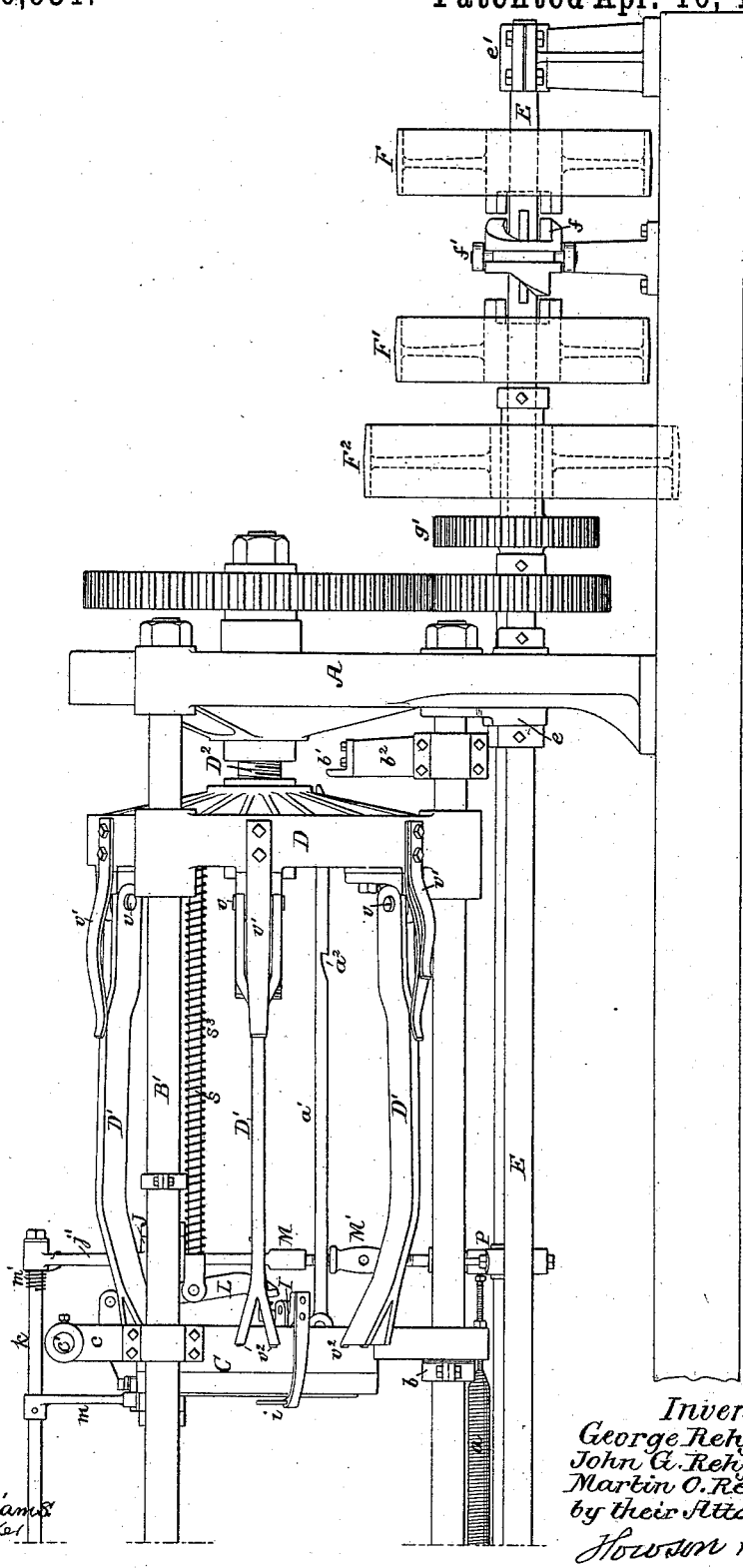

(No Model.) 5 Sheets—Sheet 4.

G., J. G. & M. O. REHFUSS.
BARREL MAKING MACHINE.

No. 380,931. Patented Apr. 10, 1888.

Witnesses:
John E. Parker
David J. Williams

Inventors:
George Rehfuss
John G. Rehfuss &
Martin O. Rehfuss
by their Attorneys
Howson & Sons (No Model.) 5 Sheets—Sheet 5.
G., J. G. & M. O. REHFUSS.
BARREL MAKING MACHINE.
No. 380,931. Patented Apr. 10, 1888.
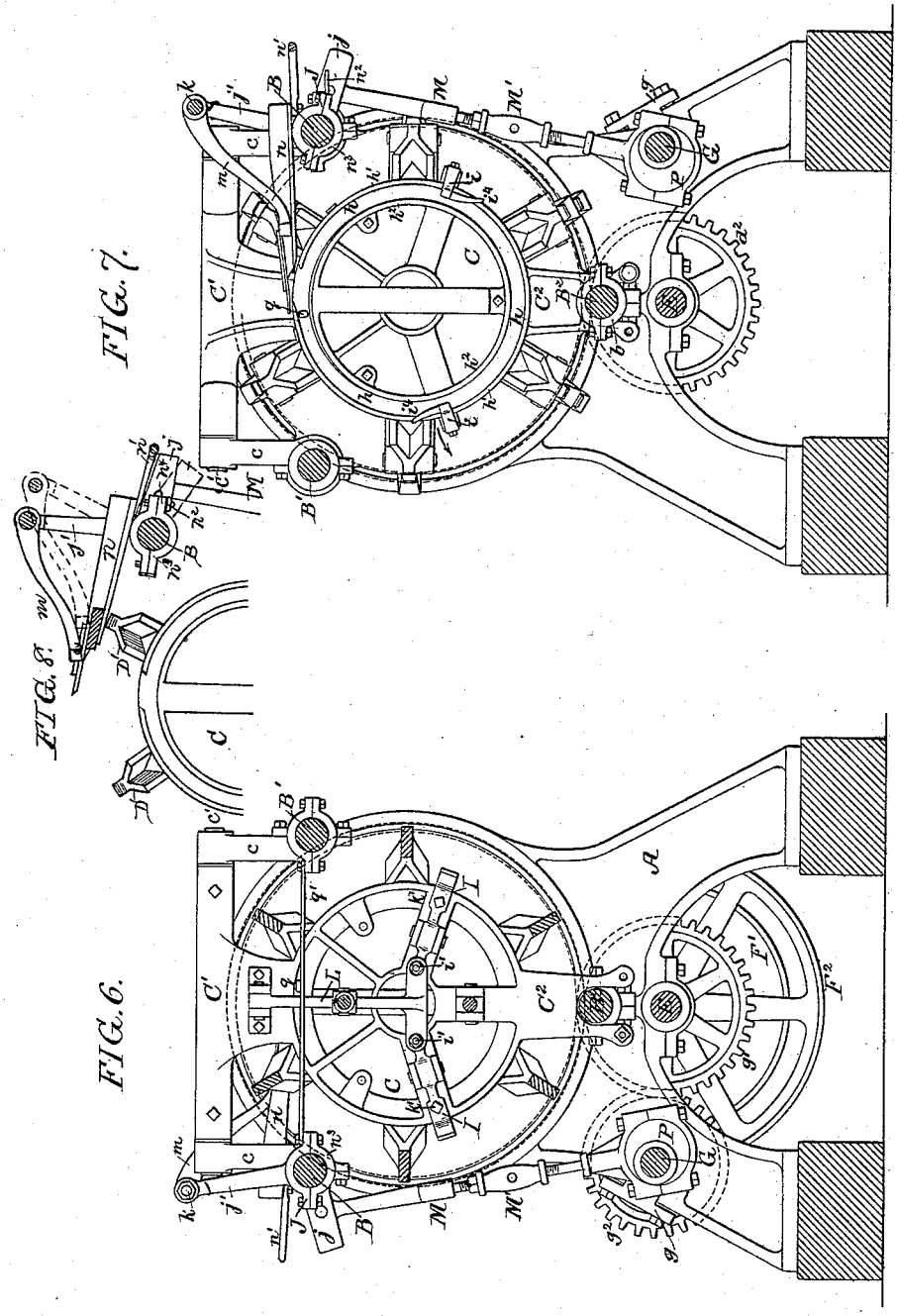
Witnesses:
David S. Williams.
John E. Parker.
Inventors:
George Rehfuss.
John G. Rehfuss. &
Martin O. Rehfuss.
by their Attorneys.
Howson & Sons.

UNITED STATES PATENT OFFICE.

GEORGE REHFUSS, JOHN GEORGE REHFUSS, AND MARTIN O. REHFUSS, OF PHILADELPHIA, PENNSYLVANIA, ASSIGNORS TO THE AMERICAN BARREL AND STAVE COMPANY, OF CAMDEN, NEW JERSEY.

BARREL-MAKING MACHINE.

SPECIFICATION forming part of Letters Patent No. 380,931, dated April 10, 1888.

Application filed January 24, 1887. Serial No. 225,328. (No model.)

*To all whom it may concern:*

Be it known that we, GEORGE REHFUSS, JOHN GEORGE REHFUSS, and MARTIN O. REHFUSS, all citizens of the United States, residing in Philadelphia, Pennsylvania, have invented certain Improvements in Barrel-Making Machines, of which the following is a specification.

Our invention consists of improvements in barrel making or setting-up machinery such as that shown in Patent No. 300,193, granted June 10, 1884, to M. E. Beasley and E. M. Hugentobler, our improvements relating mainly to the stave-feeding devices, barrel-releasing mechanism, and head-retaining devices.

Figure 1:
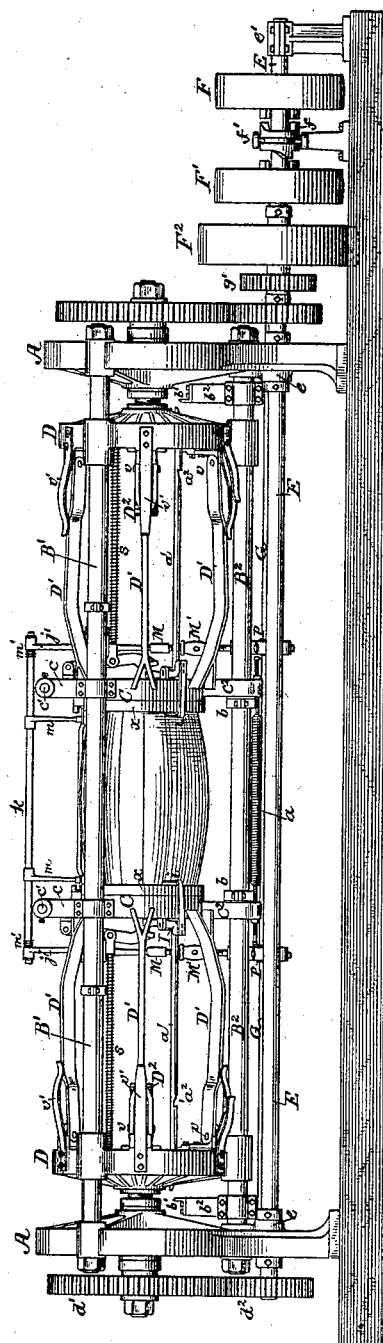
Figure 2:
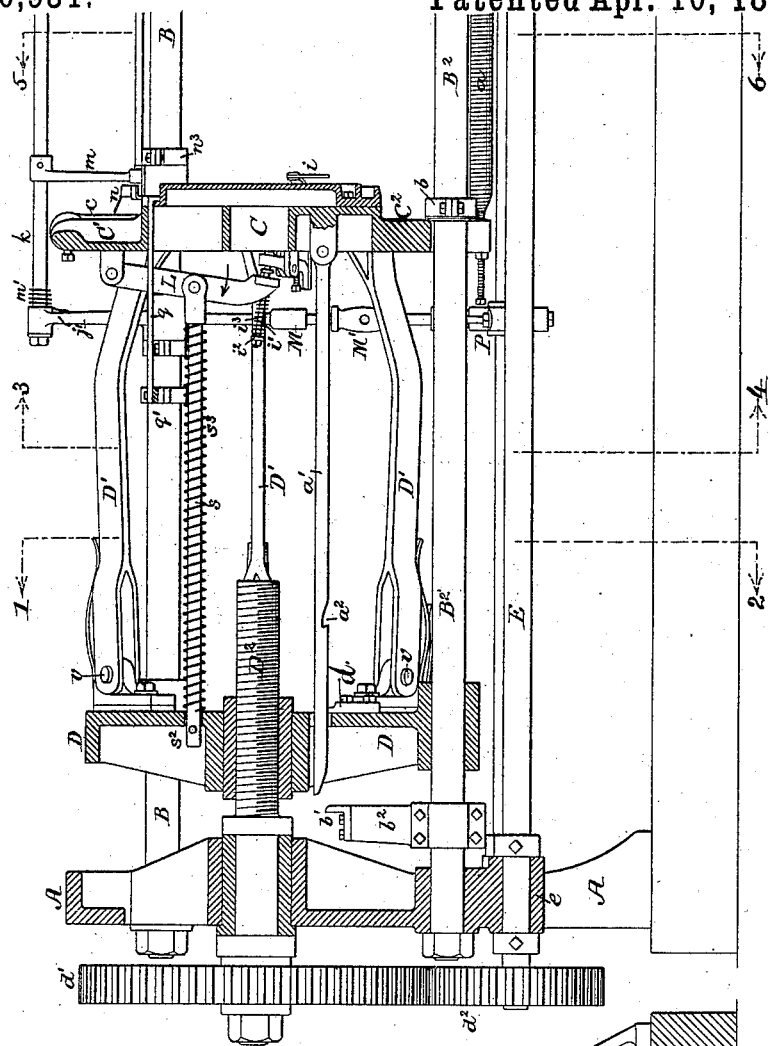
Figure 5:
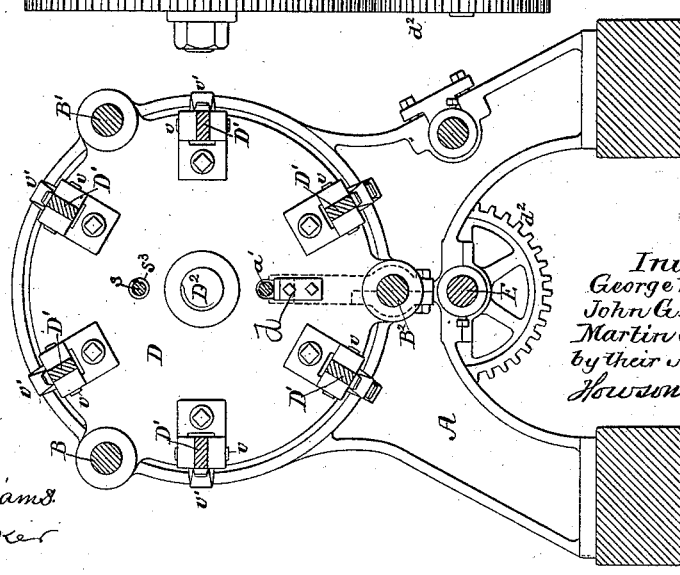
Figure 4:
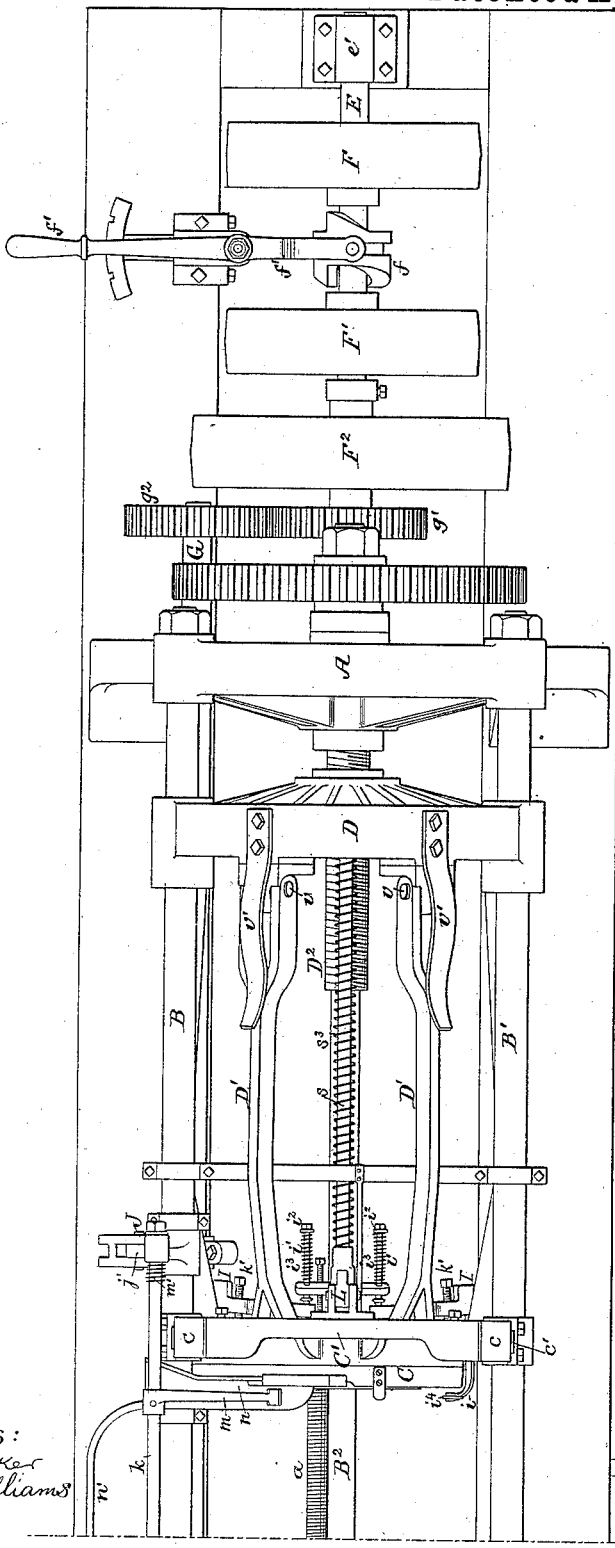

In the accompanying drawings, Figure 1 is a side view of our improved barrel making or setting-up machine. Fig. 2 is a longitudinal section, partly in elevation, of one half of the machine, drawn to a larger scale. Fig. 3 is an enlarged side view of the opposite half of the machine. Fig. 4 is a plan view of that portion of the machine shown in Fig. 3. Fig. 5 is a transverse section on the line 1 2, Fig. 2. Fig. 6 is a transverse section on the line 3 4, Fig. 2; and Fig. 7 is a transverse section on the line 5 6, Fig. 2. Fig. 8 is a detached view of parts of Fig. 7 in an elevated position.

The machine is so constructed that the staves are fed in around the heads of the barrels one by one, each stave forcing around the head the staves in advance, said staves being guided in grooves in guiding-heads of the machine. When the barrel-heads are surrounded by the staves, the feeding device is thrown out of action, and one hoop is forced on from each end by means of fingers pivoted to sliding heads, which are then retracted, so as to be clear of the barrel. After this the two guide-heads are moved apart, allowing the barrel to drop out of the machine, and as soon as the barrel is clear of the machine the heads return to their normal position, new barrels are inserted, and the stave-feeding device again resumes its operations.

We give at the outset this brief description of the operation of the machine in order to facilitate a clear understanding of the construction of the machine.

The fixed frame of the machine is similar in construction to that of the machine shown in the aforesaid patent, and consists of the end frames, A A, tied together by longitudinal bolts or rods B B' B², three in the present instance. Secured to the upper tie-rods, B B', are brackets $c$ $c$, and to the latter are pivoted heads C C, which carry the heads of the barrel and are grooved, so as to guide the staves around the heads, as set forth hereinafter. Sliding on the tie-rods B, between each of the heads C C and the adjacent end frame, A, is a hoop-driving head, D, actuated by mechanism described hereinafter.

Each head D carries arms D', pivoted to the head at $v$, and the forked ends of the arms are forced inward by springs $v'$, the extreme ends of the forks being provided with small lips or projections $v^2$, Fig. 3, which pass under the hoop as it is driven on the barrel and prevent the fingers from slipping over the hoop.

E is the main driving-shaft, extending the full length of the machine, and having its bearings in boxes $e$ $e$ on the end frames, A A, of the machine, and also in the pedestal $e'$ at the extreme end, as shown in Fig. 1. Between the pedestal $e'$ and the adjacent end frame of the machine are situated on the shaft E the driving-pulleys F F' F². The pulleys F F' are loose on the shaft, and between these pulleys is a clutch sleeve, $f$, adapted to slide on the shaft, but splined thereto, so as to be compelled to turn therewith.

The pulleys F F' are driven in reverse directions, and when the clutch is in gear with the pulley F the machine is driven forward, while when the clutch is in gear with the pulley F' the machine is reversed. A suitable hand-lever, $f'$, within easy reach of the attendant, serves to control the movement of the clutch.

The pulley F² is fast on the hub of a gear-wheel, $g'$, which is loose on the shaft E and meshes with a gear-wheel, $g^2$, on a counter-shaft, G, the latter being journaled in boxes $g$ $g$ on the end frames, A A. The pulley F² and shaft G drive the stave-feeding mechanism, which I will now proceed to describe, reference being had to Figs. 1, 2, 4, and 7.

On the shaft G are two eccentrics, P P, which vibrate a pair of bell-crank levers, J, pivoted to the upper tie-rod B, the eccentrics being connected to the arms $j$ of the levers through the medium of the eccentric-rods M, which have adjustable couplings M', the couplings shown in the present instance being right and left hand screw-sleeves, which can be adjusted so as to regulate the feed movement as required. The arms $j'$ of the bell-crank levers are provided at the ends with bearings for a rock-shaft, $k$, extending from one lever J to the other, and carrying two fingers, $m$ $m$, which feed the staves one by one into the machine, the staves being placed in advance of the fingers in guideways $n$ $n$, and the fingers are pressed down onto the guideways by springs $m'$, secured to the shaft $k$ and attached to the arms $j'$ of the levers J, as shown in Fig. 3.

The guideways $n$ $n$ are connected together by a rod, $n'$, and are pivoted to the tie-rod B, so that they can be thrown up clear of the heads C when desired, and held in the elevated position by means of a turn-button, $n^2$, Fig. 7, which is hung to one of the pivot-boxes of the guideways and is adapted to pass under a projection, $n^4$, on the collar $n^3$. (See Fig. 8.)

The movement of the fingers $m$ is not interrupted when it is desired to stop the feeding of the staves, said fingers $m$ being carried up with the guideways as the latter are elevated, in order to be out of the way of the hooping-arms, and this movement causing a stave in the feedway to assume such a position in respect to the feeding-fingers that the latter will not drop back of the stave when fully retracted. (See Fig. 8.)

The staves are fed into the annular grooves $h$ $h$ in the faces of the opposite heads C of the machine, each groove being formed by two rings, $h'$ $h^2$, and the outer ring, $h'$, being cut away at the top to permit the staves to pass into the grooves from the guideways $n$ $n$ as they are fed forward by the fingers $m$. The staves are fed around in the grooves $h$ until the proper number have been inserted to complete the barrel, whereupon the guideways are thrown up out of the way and the feeding stops until the completed barrel is dropped from the machine.

We will now describe the construction of the pivoted heads C C and the devices which retain the heads of the barrel and the staves as they are fed around said heads.

Each of the heads C is, as before remarked, pivoted to brackets $c$ $c$, which are clamped to the upper tie-rods, B B', as shown in Fig. 7, the pivot-pin $c'$ being in the present instance secured to an upper arm, C', of the head, and having its bearing in the brackets $c$. A forked lower arm, C², of the head C extends in the form of a yoke around the lower tie-rod, B², and the two heads C C are connected together at this point by a spring, $a$, tending to bring the lower portions of the two heads together; but in front of each arm C², and bolted to the rod B², is a collar, $b$, Figs. 1 and 7, for limiting the forward movement of the head. The heads C C are drawn back, so as to release the barrel, after the hoops have been driven thereon, this retracting movement being effected by the heads D on the return movement of the latter after they have placed the hoops on the barrel. A rod, $a'$, pivoted to each head C, passes through an orifice in the head D, and each rod is notched at $a^2$ to engage with the projecting portion of a bracket, $d$, Figs. 2 and 5, bolted to the head D. The end of the rod $a'$ is tapered, and when the head D draws the rod back to a certain point the tapered portion of the rod comes into contact with a shoe, $b'$, on a bracket, $b^2$, Figs. 1, 2, and 3, secured to the lower tie-rod, B², and is lifted thereby, thus releasing the head C from the head D and permitting the spring $a$ to bring the two heads back to their normal position.

The drawing back of the heads C C on their pivots allows the finished barrel to fall clear of the machine. To prevent the barrel from catching the rim $h'$ of either head when it is falling, and thus tilting the barrel and preventing its proper delivery from the machine, we provide two stationary rods, $q$, which pass through the upper portions of the heads C C, the ends of the rods being flush with the bases of the annular grooves $h$, as shown in Figs. 2 and 7. This rod $q$ is fastened to a plate, $q'$, which is attached to the upper tie-rods, B B'. The rods $q$, being stationary, will, as the heads C C are retracted, keep the barrel in a central position, or equidistant from both heads, so as to permit it to fall straight from the machine as soon as the two heads are sufficiently retracted from the flanges $h$ to clear the ends of the staves. The openings in the heads C for the reception of the rods $q$ are of sufficient size to prevent the binding of said rods in the openings as the heads swing back.

The heads D D are moved backward and forward on the tie-bars by means of screws D², the stems of which have their bearings in the frames A and are provided with collars to prevent longitudinal movement, the threaded portions of the screws being adapted to nuts on the heads. The screws have at their outer ends spur-wheels $d'$, which mesh with pinions $d^2$ on the driving-shaft E of the machine, so that by suitable operation of the clutch $f$ the heads D can be moved either forward or backward or caused to remain stationary, the movements being under the control of the attendant.

We will now describe the device for holding the barrel-heads against the heads C C of the machine prior to and during the placing of the staves around the heads.

At the rear of each head C are pivoted two levers, I, one arm of each lever carrying a finger, $i$, which projects over the face of the head C and is adapted to hold the barrel-head in place against the same. The other arm of each lever I has a rod, $i'$, which passes through an orifice in a projection on an arm, L, pivoted to a stud, I⁵, on the rear of the head C. Between the projection on the arm L and the head $i^2$ of the rods $i'$ is a spring, $i^3$, for a purpose described hereinafter. To each arm L is pivoted a rod, s, which extends through the head D and has at its outer end a pin, $s^2$, which, when the head is drawn out to its full limit, will pull the arm in the direction of the arrow, Fig. 2, thus, through the medium of the spring $i^3$ and lever I, forcing the finger $i$ laterally and toward the face of the head C, owing to the fact that said finger is bent around the head C, as shown in Fig. 3; hence its outward movement is both radial and away from the face of the head and its inward movement both radial and toward the face of the head. When the head of the barrel is placed in position in the machine, the spring $i^3$ yields sufficiently to allow the barrel-head to be inserted between the fingers $i$ and the head C. The fingers $i$ have horns or cam-like projections $i^4$, so that as the first stave traversing the groove $h$ comes into contact with this horn it will force the finger $i$ outward in the direction of its arrow, Fig. 7, and as the stave has been previously crozed and chamfered it will take the place of the finger as a means of holding the head in position, this duty being performed by the successive staves as the feeding operation is continued.

The hoops $x$ to be driven on the barrel are placed on the heads C C, as shown in Fig. 1, and consequently before the hoops can be forced onto the barrel the arms $i$ must be thrown out of their path. We therefore place a spring, $s^3$, between the inner end of the rod $s$ and the head D, as shown in Fig. 2, so that as the head D moves forward it will, through the medium of said spring, force the arm L in the direction opposite that indicated by its arrow, the fingers $i$ being consequently thrown laterally out of the path of the hoops and held out until the finished barrel is released by the pivoted heads C on the retraction of the heads D. The inward movement of the fingers $i$ is limited by set-screws $k'$, Figs. 4 and 6.

We claim as our invention—

1. The combination of the opposite heads provided with clamps for supporting the heads of the barrel and grooves for receiving the ends of the staves, mechanism for feeding the staves in succession into said grooved heads, and pusher-arms for forcing hoops over the staves, all substantially as specified.

2. The combination of the guideways for the staves, levers carrying stave-pushing fingers, and a rod to which both the ways and levers are pivoted, all substantially as specified.

3. The combination of the grooved stave-receiving heads and means for feeding the staves in succession thereto with fingers for retaining the barrel-heads and spring-actuated carriers for said fingers, whereby they can be pushed out of the way as the staves are fed around the heads of the barrel, all substantially as specified.

4. The combination of the grooved stave-receiving heads with retaining-fingers and spring-actuated levers carrying the same and pivoted in respect to the fingers as described, whereby the fingers have a movement both radially and from and toward the face of the head, all substantially as specified.

5. The combination of the grooved stave-receiving head, fingers for retaining the barrel-head thereon, the hoop-driving head and its arms, and mechanism whereby said hoop-driving head on its forward movement is caused to act upon said fingers and withdraw them from the path of the hoop, all substantially as specified.

6. The combination of the opposite heads grooved for the reception of the ends of the staves and pivoted at their upper ends, so that they can be separated to permit the discharge of the barrel after the setting up of the same is completed, all substantially as specified.

7. The combination of the opposite grooved heads pivoted at their upper ends with a spring for drawing the lower ends of the heads together and stops for limiting said inward movement, all substantially as specified.

8. The combination of the opposite grooved stave-receiving heads, the hoop-driving heads, and arms on one set of heads adapted to engage with the other set of heads as the hoop-driving heads are withdrawn after driving the hoops, whereby the stave-receiving heads are also retracted, so as to discharge the barrel, all substantially as specified.

9. The combination of the opposite grooved stave-receiving heads, the hoop-driving heads, catch-arms serving to connect said heads together and insure a simultaneous retracting movement thereof, and means for tripping said catches when the retraction of the stave-receiving heads is completed, all substantially as specified.

10. The combination of the opposite grooved heads which receive the staves during the setting up of the barrel, means for retracting said heads in order to release the barrel, and opposite retaining-fingers whereby the barrel is held in its proper central position during the retraction of the supporting-heads, all substantially as specified.

In testimony whereof we have signed our names to this specification in the presence of two subscribing witnesses.

GEORGE REHFUSS.
JOHN GEORGE REHFUSS.
MARTIN O. REHFUSS.

Witnesses:
JOHN E. PARKER,
HARRY SMITH.